UNITED STATES PATENT OFFICE.

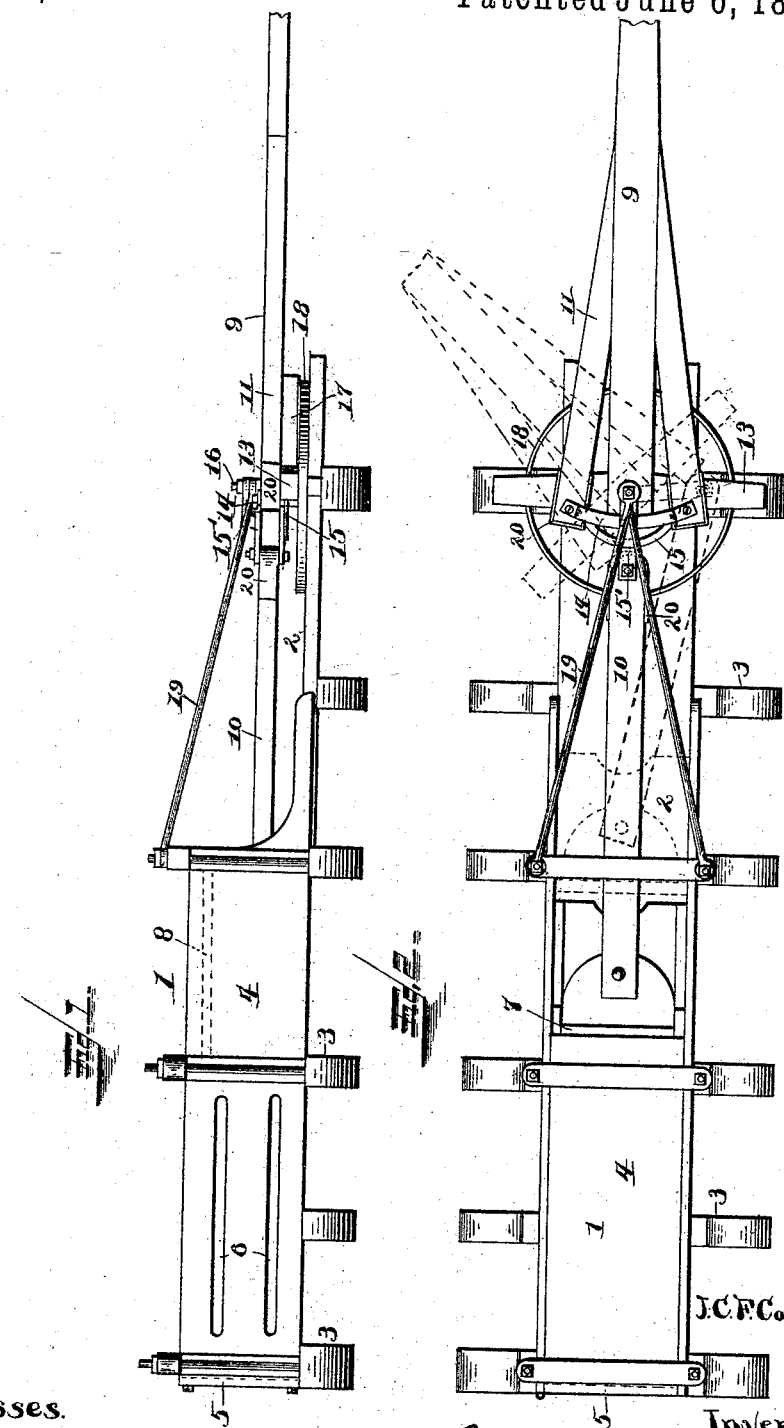

JOHN C. F. CORNELIUS, OF EL DORADO, KANSAS.

BALING-MACHINE.

SPECIFICATION forming part of Letters Patent No. 498,953, dated June 6, 1893.

Application filed July 21, 1892. Serial No. 440,792. (No model.)

*To all whom it may concern:*

Be it known that I, JOHN C. F. CORNELIUS, of El Dorado, county of Butler, and State of Kansas, have invented new and useful Improvements in Hay-Baling Machines, of which the following is a specification, reference being had to the accompanying drawings.

The object of my invention is to produce an improved hay baler of the rebounding plunger type, which consists in certain novel arrangements and construction of parts, as hereinafter specified and claimed.

In the accompanying drawings, Figure 1 is a side elevation of my hay press; and Fig. 2 a top plan view of the same.

Referring to the figures on the drawings, 1 indicates the frame of the machine, which may be made in any suitable manner, as illustrated for example in the drawings, in which the bottom plate 2 extends the whole length of the machine, and sets upon supports 3.

4 indicates the box, into which the hay is placed, and back of it it is provided with a removable end gate 5 from which the hay is withdrawn when compressed.

6 indicates apertures in the sides of the box through which the ties may be fastened if desired.

7 indicates a plunger head moving in suitable ways 8 ahead of the box. It may be made in any suitable manner, preferably as illustrated in the drawings.

9 indicates a lever, to which power—preferably horse power—is applied, and by which motion is communicated through a pitman 10 to the plunger. The lever is made of any suitable material, preferably wood, and is provided with spreader feet or braces 11 on opposite sides that rest upon a cross piece 13.

14 indicates a supporting plate, extending from the ends of the braces; and 15 indicates a similarly shaped binding piece, preferably having a curve of somewhat larger radius.

15' indicates small arms pivotally united at one end to the main pivoted bolt 16 of the lever, and at the opposite ends to the adjacent end of the pitman. These arms are of such a length as to bring the ends of the pitman alternately in contact with the ends of one or the other of the braces, and are supported by the quadrant 14 evenly and smoothly. The lever, its braces, the supporting plates, and cross pieces constitute in effect a single lever and move and operate together as a unit.

17 indicates a supporting plate fastened by any suitable means to the under side of the lever.

18 indicates an annular guide band, preferably made of metal, upon which the supporting plate travels, and whereby the lever and connected parts are held in a true horizontal plane.

19 indicates rods, which, for the sake of securing greater rigidity to the parts, extend from the main bolt to the opposite sides of the frame of the machine, as illustrated.

The bearing ends of the pitman and the braces, respectively, are preferably provided with armor plates 20 to protect them against wear.

In operation the lever is swung at right angles to the frame of the machine, so that the plunger is retracted its fullest extent. In the opening then presented the hay is filled by operators, and the lever is swung around in the opposite direction, the armored end of the pitman coming in contact with the adjacent brace and the plunger driving accurately against the hay that is in position. It will be observed that the pressure upon the pitman is directly against the end of the brace, thereby securing the greatest force and the least danger of straining the machinery. The pressure upon the pitman continues until the lever has made a little more than a quarter revolution, when, as illustrated in dotted lines in Fig. 2 of the drawings, the pressure is relieved and the resistance of the hay in the box will tend to throw the plunger forward and will cause it, in its rebound, to throw the pitman and the arms across the end of the lever until the head of the pitman comes adjacent to the opposite brace. In this position the box will again be opened for another feed, and by rotating the lever in the opposite direction, as in the manner above described, the process can be repeated until the box is filled as desired, and the bale completed. Let it be understood that the bale may be retained in its full compressed state at any time by holding the lever against the end of the pitman. It is only when the lever is turned so as to release the pitman that the plunger will rebound.

What I claim is—

1. In a hay baling device, the combination with a frame, box, plunger, and pitman, of a lever pivoted to the frame, arms pivotally connecting the end of the lever and the pitman, a supporting plate, a supporting plate fastened to the lever and adapted to support the arms in their travel, substantially as and for the purpose specified.

2. In a hay baling device, the combination of the frame, box, plunger, and pitman, of a lever provided with braces on opposite sides, arms pivotally connecting the pitman and lever, a cross piece fastened to the lever and its braces, a supporting plate and binding pieces connecting the ends of the braces for supporting and guiding the arms in their travels, substantially as and for the purpose specified.

In testimony of all which I have hereunto subscribed my name.

JOHN C. F. CORNELIUS.

Witnesses:
V. P. MOONEY,
C. C. WINGERT.